US012812437B2

(12) United States Patent
Yamamoto et al.

(10) Patent No.: US 12,812,437 B2
(45) Date of Patent: Nov. 24, 2026

(54) COMMUNICATION APPARATUS, BASE STATION, AND COMMUNICATION METHOD FOR MEASUREMENT

(71) Applicants: DENSO CORPORATION, Kariya-city (JP); TOYOTA JIDOSHA KABUSHIKI KAISHA, Toyota (JP)

(72) Inventors: Tomoyuki Yamamoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 18/639,594

(22) Filed: Apr. 18, 2024

(65) Prior Publication Data

US 2024/0276277 A1 Aug. 15, 2024

Related U.S. Application Data

(63) Continuation of application No. PCT/JP2022/039224, filed on Oct. 21, 2022.

(30) Foreign Application Priority Data

Oct. 21, 2021 (JP) ................................ 2021-172749

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04W 56/0015* (2013.01); *H04W 76/20* (2018.02)

(58) Field of Classification Search
CPC . H04W 24/10; H04W 56/0015; H04W 76/20; H04W 72/0446; H04B 7/0626
See application file for complete search history.

(56) References Cited

U.S. PATENT DOCUMENTS

2011/0244804 A1* 10/2011 Wu ........................ H04W 76/15 455/67.11
2015/0373597 A1* 12/2015 Kim .................. H04W 36/0016 455/436

(Continued)

FOREIGN PATENT DOCUMENTS

WO 2019/193194 A1 10/2019

OTHER PUBLICATIONS

3GPP TS 38.133 V17.3.0 (Sep. 2021), 3rd Generation Partnership Project; Technical Specification Group Radio Access Network; NR; Requirements for support of radio resource management (Release 17), pp. 1-3207.

(Continued)

*Primary Examiner* — Kiet Tang
(74) *Attorney, Agent, or Firm* — Harness, Dickey & Pierce, P.L.C.

(57) ABSTRACT

A communication apparatus according to an embodiment comprises: a communicator configured to receive a radio resource control (RRC) message including a plurality of measurement gap configurations from a network; and a controller configured to perform measurement on a measurement object during each measurement gap configured on a basis of the plurality of measurement gap configurations. The RRC message includes a measurement gap sharing configuration that is associated with each of the plurality of measurement gaps and designates a measurement gap sharing scheme.

6 Claims, 20 Drawing Sheets

(51) Int. Cl.
*H04W 56/00* (2009.01)
*H04W 76/20* (2018.01)

(56) References Cited

U.S. PATENT DOCUMENTS

2024/0129893 A1* 4/2024 Si .......................... H04W 64/00
2024/0163752 A1* 5/2024 Cui .................. H04W 36/0088

OTHER PUBLICATIONS

3GPP TS 38.331 V16.6.0 (Sep. 2021), 3rd Generation Partnership Project; Technical Specification Group Radio Access Network; NR; Radio Resource Control (RRC) protocol specification (Release 16), pp. 1-961.
RP-211591, 3GPP TSG RAN Meeting #92e, Revised WID on NR and MR-DC measurement gap enhancements, Intel Corporation, MediaTek Inc., Electronic Meeting, Jun. 14-18, 2021, pp. 1-10.
Rp-212311, 3GPP TSG RAN meeting #93e, Status report to TSG, NR and MR-DC measurement gap enhancements, MediaTek Inc., Intel corporation, Electronic Meeting, Sep. 13-17, 2021, pp. 1-5.
R4-2108346, 3GPP TSG-RAN WG4 #99-e Meeting, WF on R17 NR MG enhancements—Multiple concurrent and independent MG patterns, Mediatek Inc., Electronic Meeting, May 19-27, 2021, pp. 1-11.
R4-2115343, 3GPP TSG RAN WG4 Meeting #100-e, LS on R17 NR MG enhancements—Concurrent MG, Electronic Meeting, Aug. 16-27, 2021, pp. 1-2.
R4-2115399, 3GPP TSG-RAN WG4 Meeting #100-e, Email discussion summary for [100-e][223] NR_MG_enh_1, Moderator (MediaTek inc.), Electronic Meeting, Aug. 16-27, 2021, pp. 1-62.

* cited by examiner

FIG. 4

```
RRCReconfiguration-IEs ::=          SEQUENCE {
    radioBearerConfig                   RadioBearerConfig
    secondaryCellGroup                  OCTET STRING (CONTAINING CellGroupConfig)
    measConfig                          MeasConfig
    lateNonCriticalExtension            OCTET STRING
. . .
}
```

```
MeasConfig ::=                        SEQUENCE {
    measObjectToRemoveList                MeasObjectToRemoveList
    measObjectToAddModList                MeasObjectToAddModList
    reportConfigToRemoveList              ReportConfigToRemoveList
    reportConfigToAddModList              ReportConfigToAddModList
    measIdToRemoveList                    MeasIdToRemoveList
    measIdToAddModList                    MeasIdToAddModList
    s-MeasureConfig                       CHOICE {
        ssb-RSRP                              RSRP-Range,
        csi-RSRP                              RSRP-Range
    }
    quantityConfig                        QuantityConfig
    measGapConfig                         MeasGapConfig
    measGapSharingConfig                  MeasGapSharingConfig
    ...,
    [[
    interFrequencyConfig-NoGap-r16        ENUMERATED {true}
    ]]
}
```

FIG. 9

```
RRCReconfiguration-IEs ::=            SEQUENCE {
    radioBearerConfig                   RadioBearerConfig
    secondaryCellGroup                  OCTET STRING (CONTAINING CellGroupConfig)
    measConfig                          MeasConfig
    lateNonCriticalExtension            OCTET STRING
    . . .
    nonCriticalExtension                RRCReconfiguration-vXXXX-IEs
}
```

```
RRCReconfiguration-vXXXX-IEs ::=                 SEQUENCE {
    measConfigList                      SEQUENCE (SIZE (1..maxNrofMeasConfig)) OF
MeasConfig
}
```

FIG. 12

```
MeasConfig ::=                          SEQUENCE {
    measObjectToRemoveList                  MeasObjectToRemoveList
    measObjectToAddModList                  MeasObjectToAddModList
    reportConfigToRemoveList                ReportConfigToRemoveList
    reportConfigToAddModList                ReportConfigToAddModList
    measIdToRemoveList                      MeasIdToRemoveList
    measIdToAddModList                      MeasIdToAddModList
    s-MeasureConfig                         CHOICE {
 ...,
    quantityConfig                          QuantityConfig
    measGapConfig                           MeasGapConfig
    measGapSharingConfig                    MeasGapSharingConfig
    ...,
    measGapToRemoveList                     MeasGapToRemoveList
    measGapToAddModList                     MeasGapToAddModList
    ...,
}

MeasGapToRemoveList ::=        SEQUENCE (SIZE (1..maxNrofGapId)) OF MeasGapId
```

```
MeasGapToAddModList ::=   SEQUENCE (SIZE (1..maxNrofGapId)) OF MeasGapToAddMod

MeasGapToAddMod ::=    SEQUENCE {
    measGapId              MeasGapId,
    measGapConfig          MeasGapConfig
    measGapSharingConfig   MeasGapSharingConfig
}
```

FIG. 13

```
MeasIdToAddModList ::=    SEQUENCE (SIZE (1..maxNrofMeasId)) OF MeasIdToAddMod

MeasIdToAddMod ::=        SEQUENCE {
    measId                   MeasId,
    measObjectId             MeasObjectId,
    reportConfigId           ReportConfigId
    measGapId                MeasGapId
}
```

```
MeasGapId ::=                        INTEGER (1.. maxNrofGapId)
```

FIG. 14

```
MeasConfig ::=                        SEQUENCE {
    measObjectToRemoveList                MeasObjectToRemoveList
    measObjectToAddModList                MeasObjectToAddModList
    reportConfigToRemoveList              ReportConfigToRemoveList
    reportConfigToAddModList              ReportConfigToAddModList
    measIdToRemoveList                    MeasIdToRemoveList
    measIdToAddModList                    MeasIdToAddModList
    s-MeasureConfig                       CHOICE {
 ...,
    quantityConfig                        QuantityConfig
    measGapConfig                         MeasGapConfig
    measGapSharingConfig                  MeasGapSharingConfig
    ...,
    measGapToRemoveList                   MeasGapToRemoveList
    measGapToAddModList                   MeasGapToAddModList
    ...,
    measGapSharingToRemoveList            MeasGapSharingToRemoveList
    measGapSharingToAddModList            MeasGapSharingToAddModList
 ...,
}

MeasGapToRemoveList ::=                SEQUENCE (SIZE (1..maxNrofGapId)) OF
MeasGapId

MeasGapSharingToRemoveList ::=         SEQUENCE (SIZE (1..maxNrofGapSharingId))
OF MeasGapSharingId
```

FIG. 15

```
MeasGapSharingToAddModList ::=   SEQUENCE (SIZE (1..maxNrofGapSharingId)) OF
MeasGapSharingToAddMod

MeasGapSharingToAddMod ::=    SEQUENCE {
    measGapSharingId              MeasGapSharingId,
    measGapSharingConfig          MeasGapSharingConfig
}
```

```
MeasIdToAddModList ::=    SEQUENCE (SIZE (1..maxNrofMeasId)) OF MeasIdToAddMod

MeasIdToAddMod ::=        SEQUENCE {
    measId                  MeasId,
    measObjectId            MeasObjectId,
    reportConfigId          ReportConfigId,
    measGapId               MeasGapId,
    measGapSharingId        MeasGapSharingId
}
```

```
MeasGapSharingId ::=                 INTEGER (1.. maxNrofGapSharingId)
```

FIG. 17

```
ReportConfigNR ::=                          SEQUENCE {
    reportType                                  CHOICE {
        periodical                                  PeriodicalReportConfig,
        eventTriggered                              EventTriggerConfig,
        ...
    },
    measGapId                                   MeasGapId,
}
```

FIG. 19

```
MeasObjectNR ::=                     SEQUENCE {
    ssbFrequency                         ARFCN-ValueNR
    ssbSubcarrierSpacing                 SubcarrierSpacing
    smtc1                                SSB-MTC
    smtc2                                SSB-MTC2
    refFreqCSI-RS                        ARFCN-ValueNR
    referenceSignalConfig                ReferenceSignalConfig,
    ...,
    measGapId                             MeasGapId
}
```

FIG. 20

```
MeasObjectNR ::=                    SEQUENCE {
    ssbFrequency                        ARFCN-ValueNR
    ssbSubcarrierSpacing                SubcarrierSpacing
    smtc1                               SSB-MTC
    smtc2                               SSB-MTC2
    refFreqCSI-RS                       ARFCN-ValueNR
    referenceSignalConfig               ReferenceSignalConfig,
    ...,
    measGapIdSsb                        MeasGapId,
    measGapIdCSI-RS                     MeasGapId
}
```

COMMUNICATION APPARATUS, BASE STATION, AND COMMUNICATION METHOD FOR MEASUREMENT

CROSS-REFERENCE TO RELATED APPLICATIONS

The present application is a continuation application of international Patent Application No. PCT/JP2022/039224, filed on Oct. 21, 2022, which designated the U.S., and claims the benefit of priority of Japanese Patent Application No. 2021-172749, filed on Oct. 21, 2021, the entire contents of which are incorporated herein by reference.

TECHNICAL FIELD

The present disclosure relates to a communication apparatus, a base station, and a communication method.

BACKGROUND ART

In a 3rd Generation Partnership Project (hereinafter, 3GPP (registered trademark)) which is a mobile communication system standardization project, a plurality of measurement gap configurations for configuring a gap pattern constituted by a measurement gap capable of interrupting communication with a base station are configured in a communication apparatus (see Non Patent Literature 1). Accordingly, the communication apparatus can perform measurement on a measurement object in a region other than a serving cell during the measurement gap configured on the basis of the measurement configurations in a state in which connection with the base station (the serving cell) is maintained.

In recent years, there has been discussed a method of configuring a plurality of gap patterns in a communication apparatus so that measurement can be performed on each measurement object with an optimal gap pattern even in a case in which there are a plurality of measurement objects to be measured by the communication apparatus (see Non Patent Literature 2).

CITATION LIST

Non Patent Literature

Non Patent Literature 1: 3GPP technical specification TS38.331 V16.6.0

Non Patent Literature 2: 3GPP Contribution "RP-211591"

SUMMARY OF INVENTION

A communication apparatus according to a first aspect comprises: a communicator configured to receive a radio resource control (RRC) message including a plurality of measurement gap configurations from a network; and a controller configured to perform measurement on a measurement object during each measurement gap configured on a basis of the plurality of measurement gap configurations. The RRC message includes a measurement gap sharing configuration that is associated with each of the plurality of measurement gaps and designates a measurement gap sharing scheme.

Abase station according to a second aspect comprises: a communicator configured to transmit a radio resource control (RRC) message including a plurality of measurement gap configurations to a communication apparatus. The RRC message includes a measurement gap sharing configuration that is associated with each of the plurality of measurement gaps and designates a measurement gap sharing scheme.

A communication method according to a third aspect is a communication method performed by a communication apparatus. The communication method comprises the steps of: receiving a radio resource control (RRC) message including a plurality of measurement gap configurations from a network; and performing measurement on a measurement object during each measurement gap configured on a basis of the plurality of measurement gap configurations. The RRC message includes a measurement gap sharing configuration that is associated with each of the plurality of measurement gaps and designates a measurement gap sharing scheme.

BRIEF DESCRIPTION OF DRAWINGS

Objects, features, advantages, and the like of the present disclosure will become more apparent from the following detailed description with reference to the accompanying drawings.

FIG. 4 is a diagram for describing an information element in an RRC message.

FIG. 9 is a diagram (2/2) for describing information elements in an RRC message according to the first operation example.

FIG. 12 is a diagram (2/3) for describing information elements in an RRC message according to the second operation example.

FIG. 13 is a diagram (3/3) for describing information elements in an RRC message according to the second operation example.

FIG. 14 is a diagram (1/2) for describing information elements in an RRC message according to a first modification example of the second operation example.

FIG. 15 is a diagram (2/2) for describing information elements in an RRC message according to the first modification example of the second operation example.

FIG. 17 is a diagram (2/2) for describing information elements in an RRC message according to the third operation example.

FIG. 19 is a diagram (2/2) for describing information elements in an RRC message according to the fourth operation example.

FIG. 20 is a diagram for describing information elements in an RRC message according to a fifth operation example.

DESCRIPTION OF EMBODIMENTS

Figure 1:
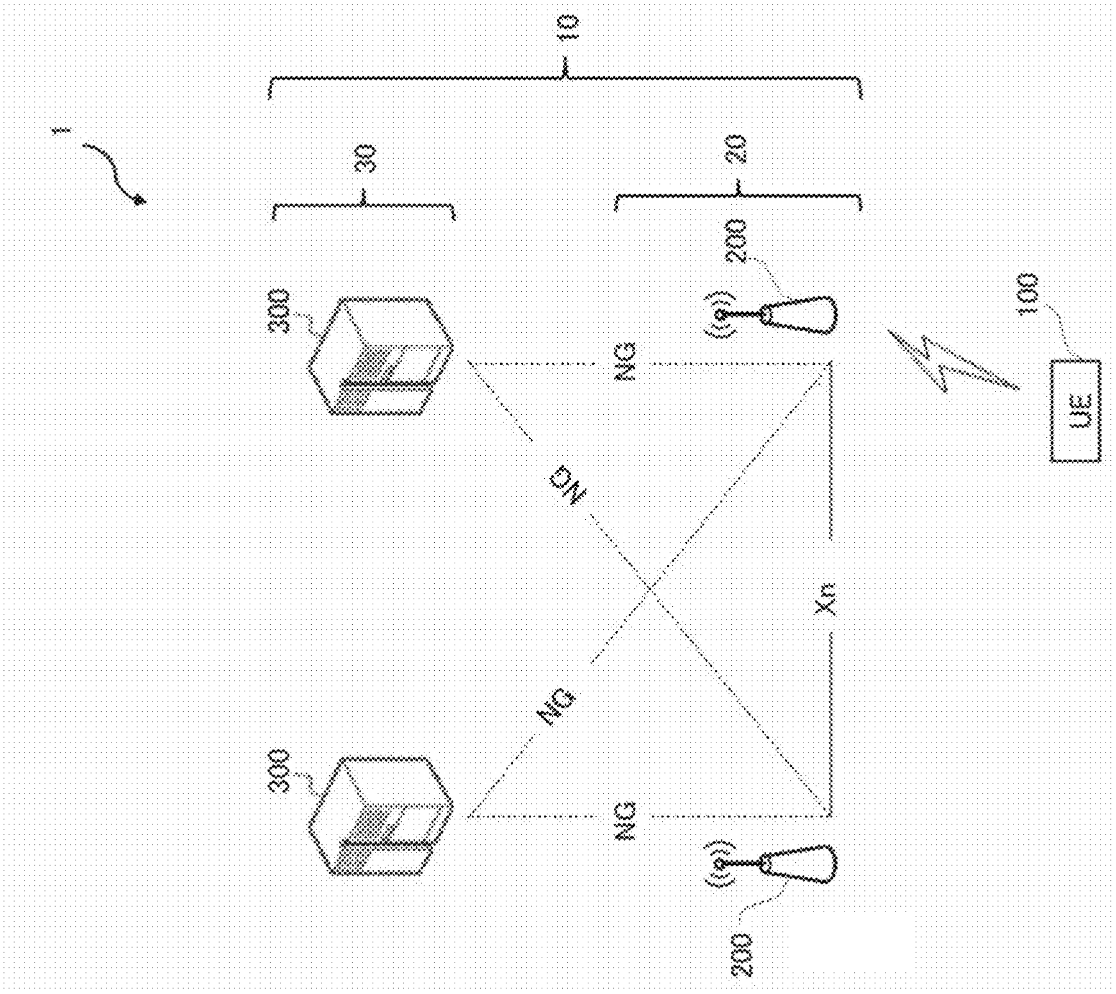
FIG. 1 is a diagram illustrating a configuration of a mobile communication system according to an embodiment.

A mobile communication system according to an embodiment will be described with reference to the drawings. In the description of the drawings, the same or similar parts are denoted by the same or similar reference numerals.

In the current 3GPP technical specification, while a plurality of measurement objects can be configured in the communication apparatus, only one gap pattern can be configured in the communication apparatus. Therefore, it is likely that it is difficult to perform appropriate measurement in a case in which a plurality of gap patterns are configured in the communication apparatus. Therefore, it is an object of the present disclosure to provide a communication apparatus, a base station, and a communication method that enable appropriate measurement in a case in which a plurality of gap patterns are configured.

(Configuration of Mobile Communication System)

A configuration of a mobile communication system 1 according to the embodiment will be described with reference to FIG. 1. The mobile communication system 1 is, for example, a system conforming to the 3GPP technical specification (TS). Hereinafter, a description will proceed with an example in which the 5th generation system (5GS) of the 3GPP standard, that is, a mobile communication system based on NR (New Radio) is used as the mobile communication system 1.

The mobile communication system 1 includes a network 10 and a user equipment (UE) 100 that communicates with the network 10. The network 10 includes an NG-RAN (Next Generation Radio Access Network) 20, which is a 5G radio access network, and a 5GC (5G Core Network) 30, which is a 5G core network.

The UE 100 is an example of a communication apparatus. The UE 100 may be a mobile radio communication apparatus. The UE 100 may be a communication apparatus that communicates via a base station 200. The UE 100 may be an apparatus used by a user. The UE 100 may be a user equipment specified in the 3GPP technical specification. The UE 100 is, for example, a mobile apparatus such as a mobile phone terminal such as a smartphone, a tablet terminal, a laptop PC, a communication module, or a communication card. The UE 100 may be a vehicle (for example, a car or a train) or an apparatus installed in a vehicle. The UE 100 may be a transport body other than a vehicle (for example, a ship or an airplane) or an apparatus installed in a transport body. The UE 100 may be a sensor or an apparatus installed in a sensor. It is noted that the UE 100 may be referred to as other names such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The NG-RAN 20 includes a plurality of base stations 200. Each of the base stations 200 manages at least one cell. A cell forms a minimum unit of a communication area. For example, one cell belongs to one frequency (carrier frequency) and is formed by one component carrier. The term "cell" may represent a radio communication resource, and may also represent a communication object of the UE 100. Each of the base stations 200 can perform radio communication with the UE 100 existing in its own cell. The base station 200 communicates with the UE 100 by using a protocol stack of RAN. The base station 200 provides NR user plane and control plane protocol terminations towards the UE 100 and is connected to a 5GC 30 via an NG interface. The base station 200 of NR may be referred to as a gNodeB (gNB).

The 5GC 30 includes a core network apparatus 300. The core network apparatus 300 includes, for example, an AMF (Access and Mobility Management Function) and/or a UPF (User Plane Function). The AMF performs mobility management of the UE 100. The UPF provides a feature specialized for user plane processing. The AMF and the UPF are connected to the base station 200 via the NG interface.

Figure 2:
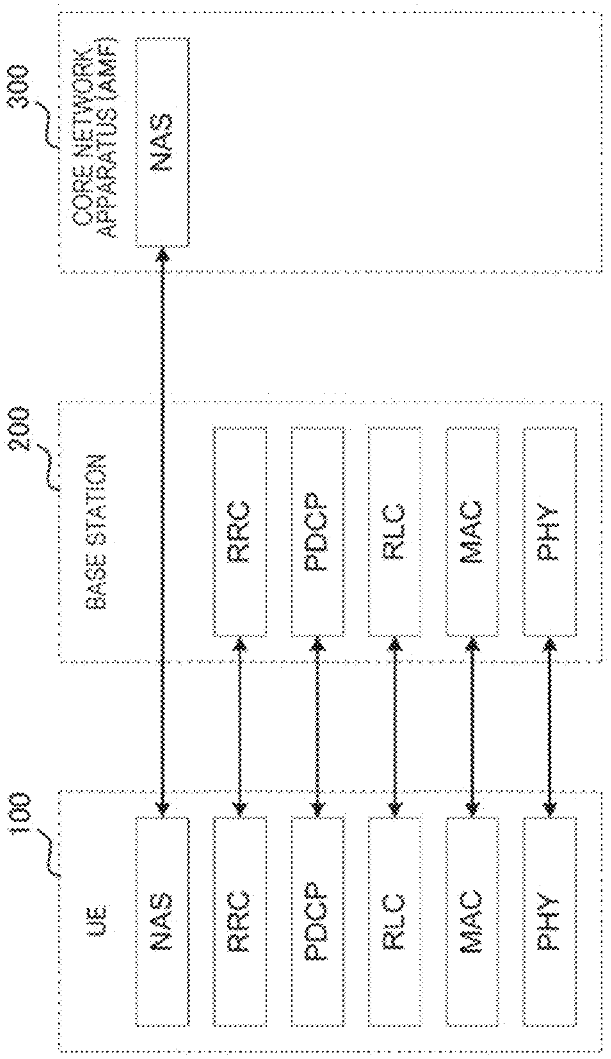
FIG. 2 is a diagram illustrating a configuration example of a protocol stack in a mobile communication system according to an embodiment.

A configuration example of the protocol stack in the mobile communication system 1 according to the embodiment will be described with reference to FIG. 2.

A protocol of a radio section between the UE 100 and the base station 200 includes a physical (PHY) layer, an MAC (Medium Access Control) layer, an RLC (Radio Link Control) layer, a packet data convergence protocol (PDCP) layer, and an RRC (Radio Resource Control) layer.

The PHY layer performs encoding and decoding, modulation and demodulation, antenna mapping and demapping, and resource mapping and demapping. Data and control information are transmitted between the PHY layer of the UE 100 and the PHY layer of the base station 200 via a physical channel.

The physical channel includes a plurality of OFDM (Orthogonal Frequency Division Multiplexing) symbols in the time domain and a plurality of subcarriers in the frequency domain. One subframe includes a plurality of OFDM symbols in the time domain. A resource block is a resource allocation unit, and includes a plurality of OFDM symbols and a plurality of subcarriers. A frame can be composed of 10 ms, and can include 10 subframes composed of 1 ms. A number of slots corresponding to a subcarrier spacing may be included in the subframe.

Among the physical channels, a physical downlink control channel (PDCCH) plays a central role for purposes such as, for example, downlink scheduling allocation, uplink scheduling grant, and transmission power control.

In the NR, the UE 100 can use a bandwidth narrower than a system bandwidth (that is, the bandwidth of the cell). The base station 200 configures a bandwidth part (BWP) of consecutive PRBs in the UE 100. The UE 100 transmits and receives data and a control signal in an active BWP. In the UE 100, for example, a maximum of four BWPs can be configured. The BWPs may have different subcarrier spacings or may have frequencies overlapping each other. In a case in which a plurality of BWPs are configured in the UE 100, the base station 200 can designate which BWP is to be activated by control in downlink. Accordingly, the base station 200 can dynamically adjust a UE bandwidth according to the amount of data traffic of the UE 100 and the like, and can reduce the UE power consumption.

The base station 200 may configure, for example, a maximum of three control resource sets (CORESETs) in each of a maximum of four BWPs on a serving cell. The CORESET is a radio resource for control information to be received by the UE 100. A maximum of 12 CORESETs may be configured on the serving cell in the UE 100. Each CORESET has indices 0 to 11. For example, the CORESET includes 6 resource blocks (PRB) and one, two, or 3 consecutive OFDM symbols in the time domain.

The MAC layer performs priority control of data, retransmission processing by hybrid ARQ (Hybrid Automatic Repeat reQuest (HARQ)), a random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size and modulation and coding scheme (MCS)) and resources to be allocated to the UE 100.

The RLC layer transmits data to the RLC layer on a reception side by using the features of the MAC layer and the PHY layer. Data and control information are transmitted between the RLC layer of the UE 100 and the RLC layer of the base station 200 via a logical channel.

The PDCP layer performs header compression and decompression and encryption and decryption.

An SDAP (Service Data Adaptation Protocol) layer may be provided as an upper layer of the PDCP layer. The SDAP (Service Data Adaptation Protocol) layer performs mapping between an IP flow that is a unit in which a core network performs QoS (Quality of Service) control, and a radio bearer that is a unit in which an AS (Access Stratum) performs QoS control.

The RRC layer controls the logical channel, the transport channel, and the physical channel in response to establishment, reestablishment, and release of the radio bearer. RRC signaling for various configurations is transmitted between the RRC layer of the UE 100 and the RRC layer of the base station 200. In a case in which there is an RRC connection between the RRC of the UE 100 and the RRC of the base station 200, the UE 100 is in an RRC connected state. In a case in which there is no RRC connection between the RRC of the UE 100 and the RRC of the base station 200, the UE 100 is in an RRC idle state. In a case in which an RRC connection between the RRC of the UE 100 and the RRC of the base station 200 is suspended, the UE 100 is in an RRC inactive state.

An NAS layer located above the RRC layer performs session management and mobility management of the UE 100. NAS signaling is transmitted between the NAS layer of the UE 100 and the NAS layer of the core network apparatus 300 (AMF). Note that the UE 100 has an application layer and the like in addition to the radio interface protocol.

(Assumed Scenario)

Figure 3:
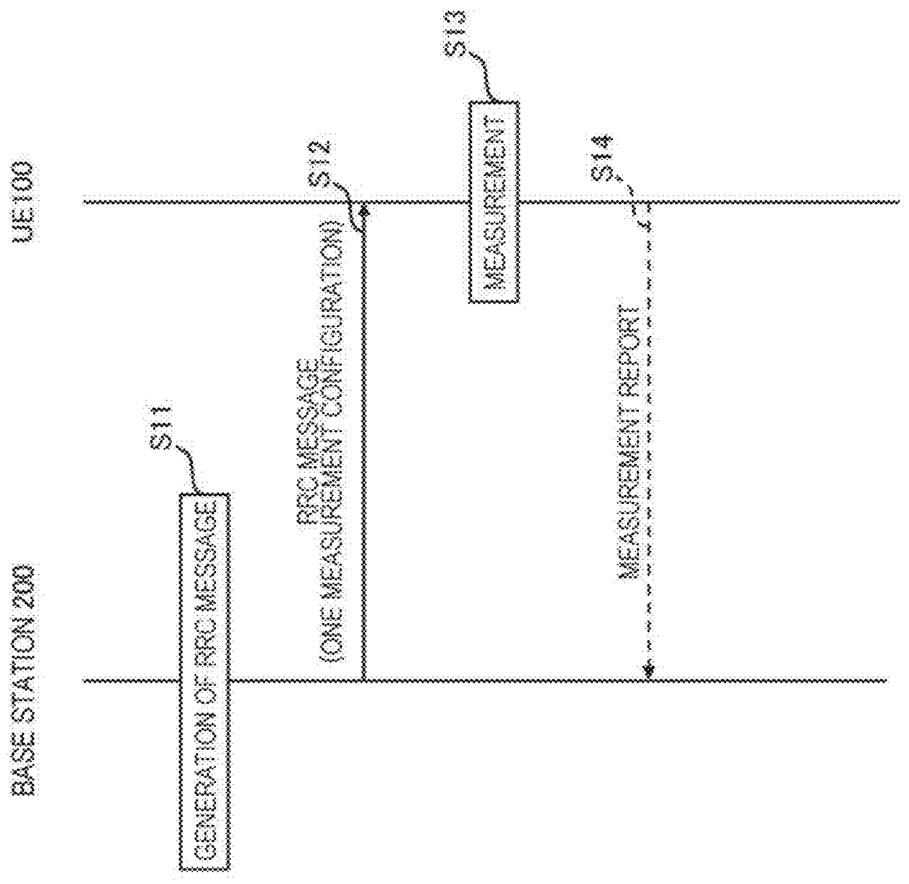
FIG. 3 is a sequence diagram illustrating an operation example of a UE in which a gap pattern is configured.

An assumed scenario in the mobile communication system 1 according to the embodiment will be described with reference to FIGS. 3 and 4. FIG. 3 illustrates a sequence of an operation example in the existing 3GPP mobile communication system, that is, the mobile communication system according to the technical specification prior to Release 16. Note that the UE 100 is in the RRC connected state. The UE 100 performs communication with the base station 200 in the serving cell managed by the base station 200.

As illustrated in FIG. 3, in step S11, the base station 200 generates a radio resource control (RRC) message. The RRC message is, for example, an RRC reconfiguration message, an RRC resume message, or the like. Hereinafter, the RRC reconfiguration message will be described as an example. The RRC reconfiguration message is a command for changing the RRC connection.

As illustrated in FIG. 4, the RRC message (for example, RRCReconfiguration) includes a measurement configuration (for example, MeasConfig) that designates measurement to be performed by the UE 100. The measurement configuration includes a list of measurement objects to be added and/or changed (for example, MeasObjectToAddModList), a list of measurement report configurations to be added and/or changed (for example, ReportConfigToAddModList), a list of measurement identifiers to be added and/or changed (for example, MeasIdToAddModList), and a measurement gap configuration (for example, MeasGapConfig). In addition, the measurement configuration may include a list of measurement objects to be deleted (for example, MeasObjectToRemoveList), a list of measurement report configurations to be deleted (for example, ReportConfigToRemoveList), and a list of measurement identifiers to be deleted (for example, MeasIdToRemoveList).

The list of measurement objects (for example, MeasObjectToAddModList) may include a plurality of measurement object configurations (for example, MeasObjectToAddMod) that designate the measurement objects. The measurement object configuration includes a set of measurement object identifier (for example, MeasObjectId) and measurement object information (for example, measObject). The measurement object identifier is used to identify the measurement object configuration. The measurement object information may be, for example, information that designates a frequency, a reference signal, and the like. The reference signal may be at least one of a synchronization signal and physical broadcast channel block (SSB) constituted by a primary synchronization signal (hereinafter, PSS), a secondary synchronization signal (hereinafter, SSS), and a physical broadcast channel (PBCH), a channel state information reference signal (CSI-RS), and a positioning reference signal (PRS). The measurement object includes, for example, a measurement object (MeasObjectNR) that designates information applicable to SS/PBCH block intra-frequency/inter-frequency measurement and/or CSI-RS intra-frequency/inter-frequency measurement.

The list of measurement report configurations (for example, ReportConfigToAddModList) may include a plurality of measurement report configurations (for example, ReportConfigToAddMod). The measurement report configuration includes a set of a reporting configuration identifier (for example, ReportConfigId) and a measurement report configuration (for example, reportConfig). The reporting configuration identifier is used to identify a measurement reporting configuration. The measurement report configuration may designate a criterion that triggers reporting of a measurement result.

The list of measurement identifiers (for example, MeasIdToAddModList) includes a set of a measurement identifier, a measurement object identifier, and a report configuration identifier (for example, MeasIdToAddMod). Therefore, the measurement identifier is associated with a combination of the measurement object configuration and the measurement report configuration via the measurement object identifier and the report configuration identifier.

The measurement gap configuration (for example, MeasGapConfig) is used to set up and release the gap pattern (for example, the measurement gap). The gap pattern is constituted by a measurement gap capable of interrupting communication. The measurement gap configuration includes gapOffset, mgl, mgrp, and mgta. mgl is a measurement gap length (measurement gap length) of the measurement gap. mgrp is a measurement gap repetition period (MGRP) of the measurement gap. mgta is measurement gap timing advance (measurement gap timing advance). gapOffset is a gap offset of a gap pattern with MGRP.

In step S12, the base station 200 transmits a generated RRC message to the UE 100. The UE 100 receives the RRC message. The UE 100 performs a configuration based on the measurement configuration included in the RRC message.

In step S13, the UE 100 performs measurement on the measurement object. Specifically, the UE 100 performs measurement on the measurement object configured on the basis of the measurement object configuration during the measurement gap configured on the basis of the measurement gap configuration.

In step S14, the UE 100 transmits the measurement report to the base station 200. The base station 200 receives the measurement report from the UE 100. The UE 100 transmits the measurement report to the base station 200 in a case in which the measurement report is triggered on the basis of the measurement report configuration.

In recent years, there has been discussed a method of configuring a plurality of gap patterns in the UE 100 so that measurement can be performed on each measurement object with an optimal gap pattern even in a case in which there are a plurality of measurement objects to be measured by the UE 100.

However, in the current 3GPP technical specification, while a plurality of measurement objects can be configured in the UE 100, only one gap pattern can be configured in the UE 100. Therefore, it is likely that it is difficult to perform appropriate measurement in a case in which a plurality of gap patterns are configured in the UE 100. In particular, in a case in which the measurement gap overlaps between two or more gap patterns associated with different measurement objects, it is likely that the UE 100 is unable to detect the measurement object to be measured during the overlapping measurement gap and to perform appropriate measurement. An embodiment to be described later with an operation for enabling appropriate measurement in a case in which a plurality of gap patterns are configured.

In addition, in the current 3GPP, the measurement gap sharing configuration (for example, MeasGapSharingConfig) indicating a time ratio when a plurality of measurement objects share the measurement gap in the time division manner is configured in the communication apparatus. The communication apparatus shares the measurement gap in the time division manner when a plurality of measurement objects exist during the measurement gap configured by the measurement configuration. Specifically, the communication apparatus performs measurement on each measurement object during the measurement gap shared in the time division manner at a time ratio based on the measurement gap sharing configuration.

However, in the current 3GPP technical specification, while a plurality of measurement objects can be configured in the communication apparatus, only one gap pattern can be configured in the communication apparatus. Therefore, in a case in which a plurality of gap patterns are configured in the communication apparatus, it is likely that it is difficult to perform appropriate measurement since the gap pattern to which the measurement gap sharing configuration is to be applied is not detected. An embodiment to be described later with an operation for enabling appropriate measurement in a case in which a plurality of gap patterns are configured.

(Configuration of User Equipment)

Figure 5:
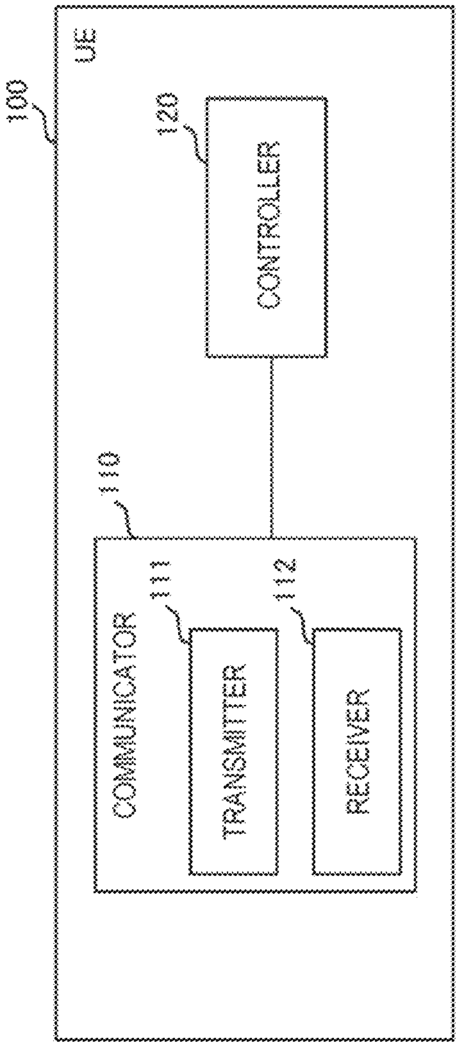
FIG. 5 is a diagram illustrating a configuration of a UE according to an embodiment.

A configuration of the UE 100 according to an embodiment will be described with reference to FIG. 5. The UE 100 includes a communicator 110 and a controller 120.

The communicator 110 performs radio communication with the base station 200 by transmitting and receiving a radio signal to and from the base station 200. The communicator 110 includes at least one transmitter 111 and at least one receiver 112. The transmitter 111 and the receiver 112 may include a plurality of antennas and RF circuits. The antenna converts a signal into a radio wave and emits the radio wave into space. Further, the antenna receives a radio wave in space and converts the radio wave into a signal. The RF circuit performs analog processing of a signal transmitted and received via the antenna. The RF circuit may include a high frequency filter, an amplifier, a modulator, a low pass filter, and the like.

The controller 120 performs various types of control in the UE 100. The controller 120 controls communication with the base station 200 via the communicator 110. The operation of the UE 100 described above and described later may be an operation under the control of the controller 120. The controller 120 may include at least one processor capable of executing a program and a memory that stores the program. The processor may execute the program to perform the operation of the controller 120. The controller 120 may include a digital signal processor that executes digital processing of the signal transmitted and received via the antenna and the RF circuit. The digital processing includes processing of the protocol stack of the RAN. Further, the memory stores a program executed by the processor, parameters related to the program, and data related to the program. The memory may include at least one of an ROM (Read Only Memory), an EPROM (Erasable Programmable Read Only Memory), an EEPROM (Electrically Erasable Programmable Read Only Memory), an RAM (Random Access Memory), and a flash memory. All or part of the memory may be included in the processor.

The UE 100 configured as described above performs communication with the base station 200. In the UE 100, the communicator 110 receives, from the base station 200, a radio resource control (RRC) message including a plurality of measurement gap configurations for configuring a plurality of gap patterns constituted by the measurement gaps capable of interrupting communication. The controller 120 performs measurement on the measurement object during the measurement gap configured on the basis of a plurality of measurement gap configurations. In the RRC message, each of a plurality of measurement gap configurations is associated with the measurement gap sharing configuration indicating the time ratio when a plurality of measurement objects share the measurement gap in the time division manner. Accordingly, the UE 100 (the controller 120) can apply the measurement gap sharing configuration to the gap pattern (the measurement gap) based on the measurement gap configuration associated with the measurement gap sharing configuration. As a result, even though the RRC message includes a plurality of measurement gap configurations, it is possible to detect the gap pattern to which the measurement gap sharing configuration is to be applied and perform appropriate measurement. As a result, in a case in which a plurality of gap patterns are configured, appropriate measurement can be performed.

(Configuration of Base Station)

Figure 6:
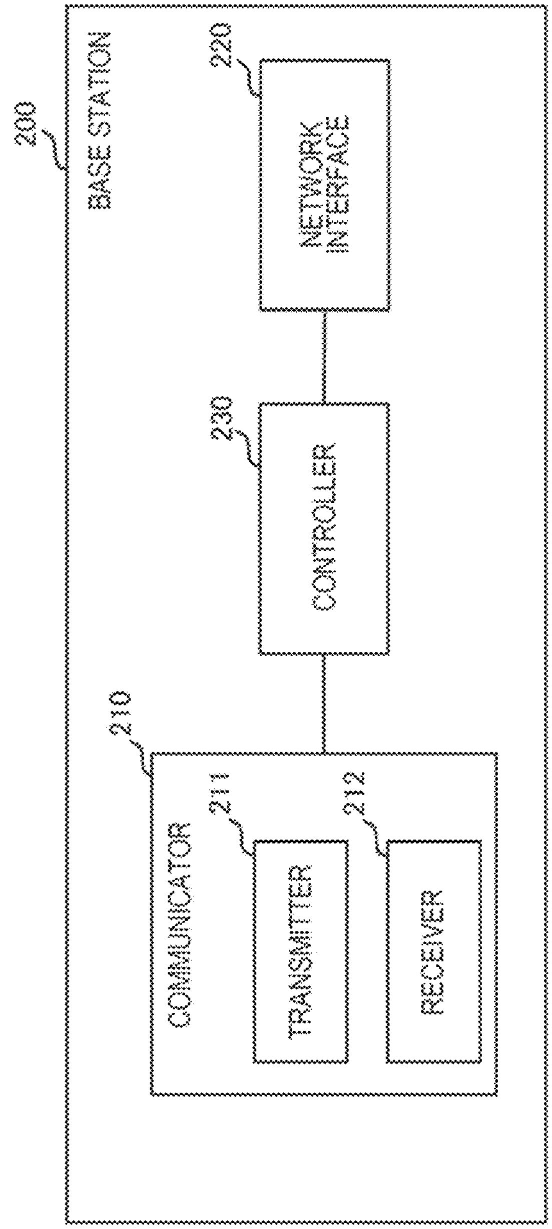
FIG. 6 is a diagram illustrating a configuration of a base station according to an embodiment.

A configuration of the base station 200 according to an embodiment will be described with reference to FIG. 6. The base station 200 includes a communicator 210, a network interface 220, and a controller 230.

For example, the communicator 210 receives a radio signal from the UE 100 and transmits a radio signal to the UE 100. The communicator 210 includes at least one transmitter 211 and at least one receiver 212. The transmitter 211 and the receiver 212 may include an RF circuit. The RF circuit performs analog processing of a signal transmitted and received via the antenna. The RF circuit may include a high frequency filter, an amplifier, a modulator, a low pass filter, and the like.

The network interface 220 transmits and receives a signal to and from a network. The network interface 220 receives, for example, a signal from a neighboring base station connected via an Xn interface, which is an interface between base stations, and transmits the signal to the neighboring base station. In addition, the network interface 220 receives a signal from the core network apparatus 300 connected via the NG interface, for example, and transmits a signal to the core network apparatus 300.

The controller 230 performs various types of control in the base station 200. The controller 230 controls, for example, communication with the UE 100 via the communicator 210. Furthermore, the controller 230 controls, for example, communication with a node (for example, the neighboring base station and the core network apparatus 300) via the network interface 220. The operation of the base station 200 described above and described later may be an operation under the control of the controller 230. The controller 230 may include at least one processor capable of executing a program and a memory that stores the program. The processor may execute the program to perform the operation of the controller 230. The controller 230 may include a digital signal processor that executes digital processing of a signal transmitted and received via the antenna and the RF circuit. The digital processing includes processing of the protocol stack of the RAN. Further, the memory stores a program executed by the processor, parameters related to the program, and data related to the program. All or part of the memory may be included in the processor.

The base station 200 configured as described above performs communication with the UE 100. In the base station 200, the controller 230 generates a radio resource control (RRC) message including a plurality of measurement gap configurations for configuring a plurality of gap patterns constituted by the measurement gaps capable of interrupting communication. The communicator 210 transmits the RRC message to the UE 100. In the RRC message, each of a plurality of measurement gap configurations is associated with the measurement gap sharing configuration indicating the time ratio when a plurality of measurement objects share the measurement gap in the time division manner. Accordingly, the UE 100 (the controller 120) can apply the measurement gap sharing configuration to the gap pattern (the measurement gap) based on the measurement gap configuration associated with the measurement gap sharing configuration. As a result, even though the RRC message includes a plurality of measurement gap configurations, it is possible to detect the gap pattern to which the measurement gap sharing configuration is to be applied and perform appropriate measurement. As a result, in a case in which a plurality of gap patterns are configured, appropriate measurement can be performed.

(Operation of Mobile Communication System)

(1) First Operation Example

A first operation example of the mobile communication system 1 will be described with reference to FIGS. 7 to 9. Note that differences from the above description will be mainly described.

Figure 7:
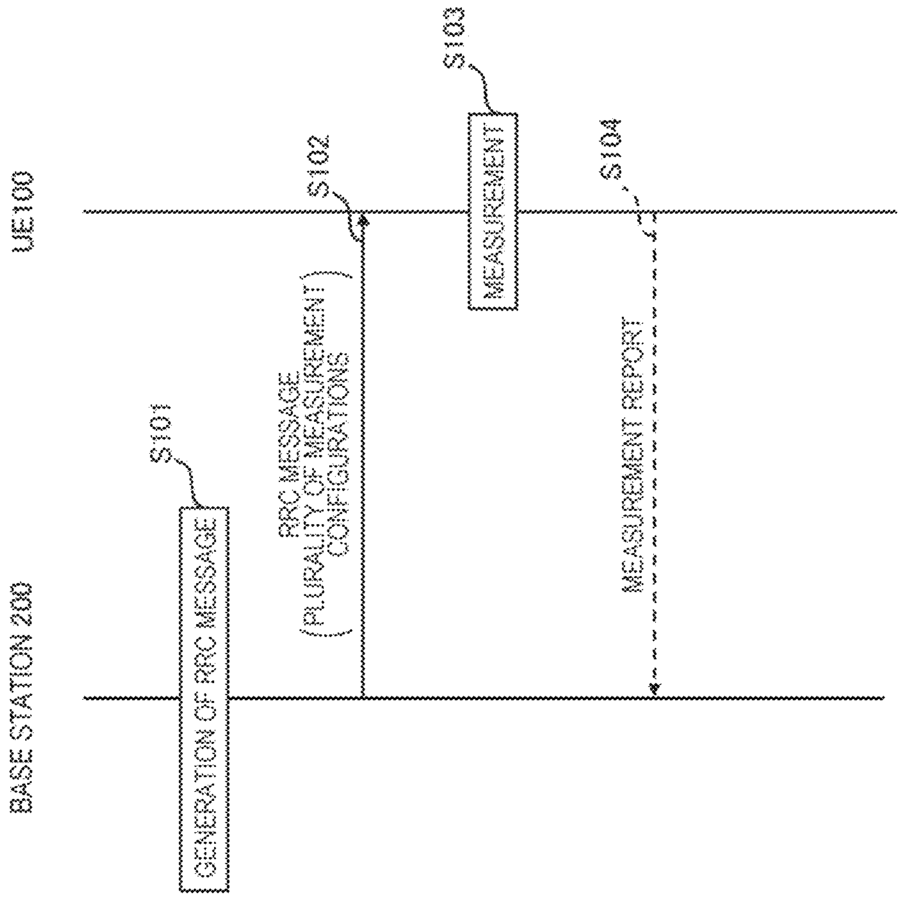
FIG. 7 is a sequence diagram for describing an operation example according to an embodiment.
Figure 8:
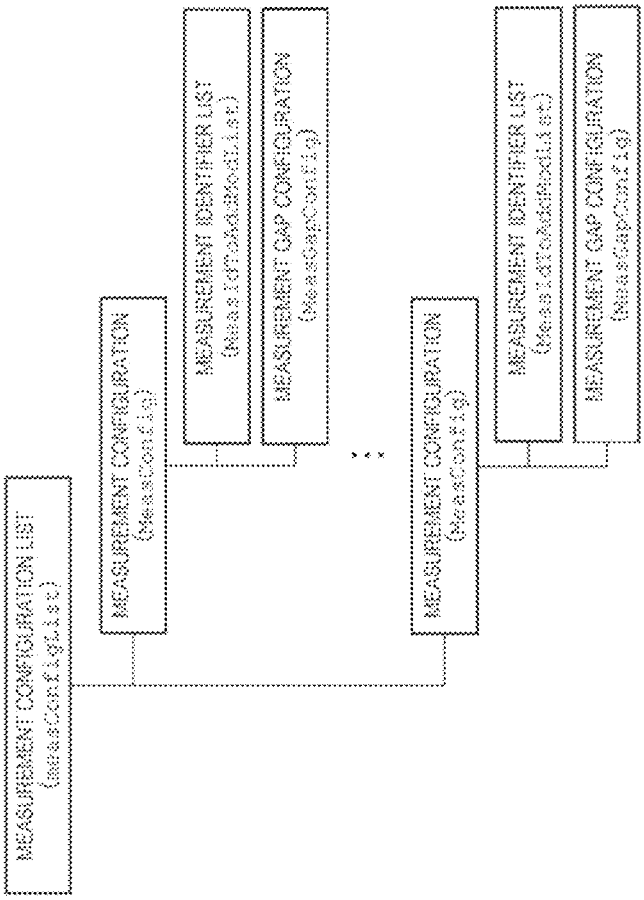
FIG. 8 is a diagram (1/2) for describing information elements in an RRC message according to a first operation example.

As illustrated in FIG. 7, in step S101, the base station 200 (the controller 230) generates the RRC message. The RRC message includes a plurality of measurement gap configurations. In the RRC message, each of a plurality of measurement gap configurations is associated with at least one measurement identifier associated with a combination of the measurement object configuration and the measurement report configuration.

In the present operation example, the RRC message includes a plurality of measurement configurations. Each of a plurality of measurement configurations includes one measurement gap configuration and at least one measurement identifier associated with the measurement gap configuration. As illustrated in FIGS. 8 and 9, each of a plurality of measurement configurations includes a set of one measurement gap configuration and a list of measurement identifiers. Accordingly, one measurement gap configuration is associated with each measurement identifier in the list of measurement identifiers associated with the measurement gap configuration.

As illustrated in FIG. 9, the RRC message may include an existing measurement configuration (MeasConfig), separately from the list of measurement configurations (measConfigList). The existing measurement configuration may be dealt as one of a plurality of measurement configurations. The measurement configurations in the list of measurement configurations may be dealt as a second or subsequent measurement configuration. Alternatively, the existing measurement configuration may become unavailable in a case in which a list of measurement configurations is included in the RRC message. In addition, the existing measurement configuration may be used only in a case in which the UE 100 does not support the configuration of a plurality of gap patterns. In a case in which the UE 100 supports the configuration of a plurality of gap patterns, the existing measurement configuration may become unavailable.

Further, in the present operation example, each of a plurality of measurement configurations (MeasConfig) included in the RRC message includes the measurement gap sharing configuration (MeasGapSharingConfig) in addition to the measurement gap configuration (MeasGapConfig) (see FIG. 4). Therefore, the RRC message includes a set (MeasConfig) of each of a plurality of measurement gap configurations and the measurement gap sharing configuration. Accordingly, in the RRC message, each of a plurality of measurement gap configurations is associated with the measurement gap sharing configuration.

The measurement gap sharing configuration indicates the time ratio when a plurality of measurement objects share the measurement gap in the time division manner. Further, the measurement gap sharing configuration also designates a measurement gap sharing scheme. The measurement gap sharing configuration may indicate, for example, any one of “Scheme 00,” “Scheme 01,” “Scheme 10,” and “Scheme 11.” “Scheme 00” indicates that a time proportion of measurement (hereinafter, first measurement) for a first measurement object is identical to a time proportion of measurement (hereinafter, second measurement) for a second measurement object, and may indicate that the degree of priority of the first measurement is identical to the degree of priority of the second measurement. “Scheme 01” may indicate, for example, that an X value used for calculating the time proportion is 25%, and that the degree of priority of the first measurement (or the second measurement) is higher than the degree of priority of the second measurement (or the first measurement). “Scheme 10” may indicate, for example, that the X value used for calculating the time proportion is 50%, and that the degree of priority of the first measurement is identical to the degree of priority of the second measurement. “Scheme 11” may indicate, for example, that an X value used for calculating the time proportion is 75%, and that the degree of priority of the first measurement (or the second measurement) is lower than the degree of priority of the second measurement (or the first measurement).

In step S102, the base station 200 (the controller 230) transmits the RRC message to the UE 100. The UE 100 (the receiver 112) receives the RRC message from the base station 200. The UE 100 (the communicator 110) performs configurations on the basis of a plurality of measurement configurations.

In step S103, the UE 100 (the controller 120) performs measurement on the measurement object. Specifically, the UE 100 (the controller 120) performs measurement on the measurement object configured on the basis of the measurement object configuration during the measurement gap configured on the basis of a plurality of measurement gap configurations. The UE 100 (the controller 120) configures a plurality of gap patterns on the basis of a plurality of measurement gap configurations. Specifically, in a case in which measurement is performed on a designated measurement object, the UE 100 (the controller 120) performs the measurement with the gap pattern based on the measurement gap configuration associated with the measurement identifier associated with the designated measurement object. That is, in a case in which measurement on the measurement object based on the measurement object configuration included in any one of a plurality of measurement configurations is performed, the UE 100 (the controller 120) performs the measurement during the measurement gap according to the gap pattern based on one measurement gap configuration in the measurement configuration.

Figure 10:
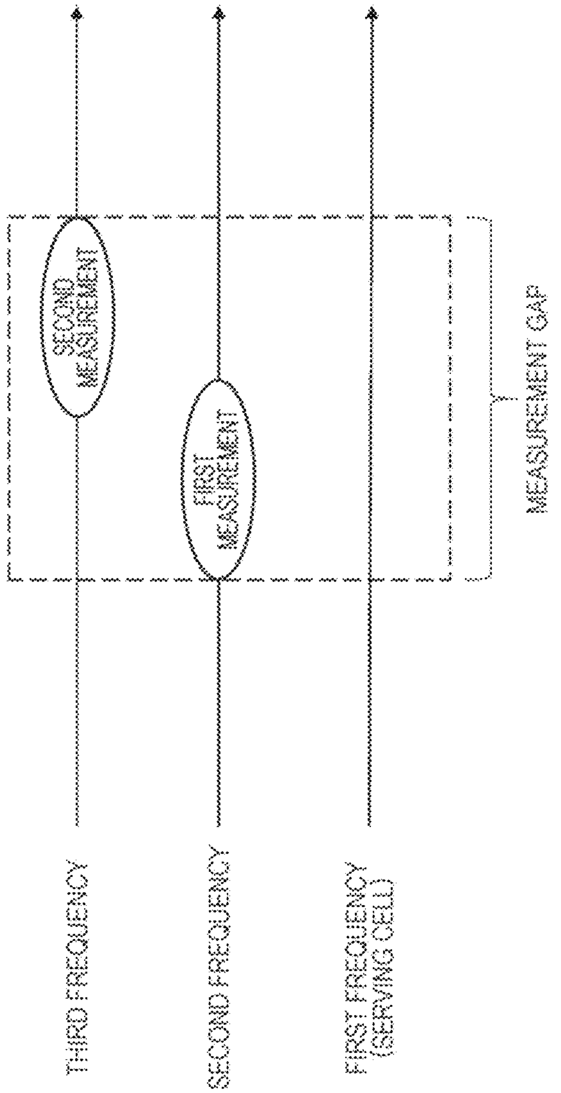
FIG. 10 is a diagram for describing an example of measurement performed by a UE according to an embodiment.

Further, the description will proceed with a case in which a plurality of measurement objects share the measurement gap in the time division manner when the UE 100 (the controller 120) performs communication with the base station 200 at a first frequency (serving cell) as illustrated in FIG. 10. For example, the UE 100 (the controller 120) performs first measurement on the measurement object at a second frequency and second measurement on the measurement object at a third frequency during one measurement gap of the gap pattern based on one measurement gap configuration.

Here, the UE 100 (the controller 120) calculates the time ratio when the measurement gap is shared in the time division manner on the basis of the measurement gap sharing configuration (that is, the measurement gap sharing configuration included in the same measurement configuration as the measurement gap configuration) associated with the measurement gap configuration. The UE 100 (the controller 120) first performs the first measurement during the measurement gap on the basis of the calculated time ratio, and then performs the second measurement until the measurement gap ends after the first measurement operation is performed.

In the present operation example, one measurement gap configuration, the measurement object configuration for the first measurement, and the measurement object configuration for the second measurement are included in the same measurement configuration.

In step S104, the UE 100 (the communicator 110) transmits the measurement report to the base station 200. The base station 200 receives the measurement report from the UE 100. The UE 100 transmits the measurement report to the base station 200 in a case in which the measurement report is triggered on the basis of the measurement report configuration.

As described above, in the RRC message, each of a plurality of measurement gap configurations is associated with at least one measurement identifier. Accordingly, the UE 100 (the controller 120) can perform the measurement based on the measurement object configuration associated with at least one measurement identifier during the measurement gap constituting the gap pattern based on the measurement gap configuration associated with the measurement identifier. Therefore, even though a plurality of gap patterns are configured, the UE 100 (the controller 120) can determine the gap pattern to be used for measurement and a type of measurement. Furthermore, the base station 200 (the controller 230) can appropriately control the gap pattern which is used for measurement by the UE 100. As a result, in a case in which a plurality of gap patterns are configured, appropriate measurement can be performed.

Further, the RRC message includes a plurality of measurement configurations. Each of a plurality of measurement configurations includes one measurement gap configuration and at least one measurement identifier associated with the measurement gap configuration. Accordingly, in each measurement configuration, the measurement gap configuration is associated with the measurement object via the measurement identifier, and thus the information structure in the measurement configuration is similar to that of the existing measurement configuration. Therefore, since only a change of making a list of measurement configurations is required, the influence on the technical specification can be reduced as compared with the case of changing the information structure in the measurement configurations.

In addition, the base station 200 (the controller 230) generates an RRC message including a plurality of measurement gap configurations. The base station 200 (the communicator 210) transmits the RRC message to the UE 100. The UE 100 (the communicator 110) receives the RRC message including a plurality of measurement gap configurations from the base station 200. The UE 100 (the controller 120) performs the measurement on the measurement object during the measurement gap configured on the basis of a plurality of measurement gap configurations. In the RRC message, each of a plurality of measurement gap configurations is associated with the measurement gap sharing configuration indicating the time ratio when a plurality of measurement objects share the measurement gap in the time division manner. Accordingly, the UE 100 (the controller 120) can apply the measurement gap sharing configuration to the gap pattern (the measurement gap) based on the measurement gap configuration associated with the measurement gap sharing configuration. As a result, even though the RRC message includes a plurality of measurement gap configurations, it is possible to detect the gap pattern to which the measurement gap sharing configuration is to be applied and perform appropriate measurement. As a result, in a case in which a plurality of gap patterns are configured, appropriate measurement can be performed.

(2-1) Second Operation Example

The present operation example will be described with reference to FIG. 7 and FIGS. 11 to 13, focusing on differences from the above-described operation examples. In the present operation example, in the RRC message, each of a plurality of measurement gap configurations is associated with the measurement gap identifier.

In step S101, the base station 200 (the controller 230) generates the RRC message, similarly to the above-described operation examples. As illustrated in FIG. 12, the measurement configuration (MeasConfig) included in the RRC message includes a list (MeasGapToAddModList) of measurement gap configurations to be added and/or changed. The measurement configuration may include a list of measurement gap identifiers (MeasGapToRemoveList) to be deleted.

The list of measurement gap configurations (MeasGapToAddModList) includes a set (MeasGapToAddMod) of measurement gap identifier (MeasGapId) and a plurality of measurement gap configurations (MeasGapConfig). The measurement gap identifier is used to identify the measurement gap configuration. As described above, each of a plurality of measurement gap configurations is associated with the measurement gap identifier.

Further, as illustrated in FIG. 12, the set (MeasGapToAddMod) further includes the measurement gap sharing configuration (MeasGapSharingConfig). Therefore, the RRC message includes a set of each of a plurality of measurement gap configurations and the measurement gap sharing configuration. As a result, each of a plurality of measurement gap configurations is associated with the measurement gap sharing configuration.

Figure 11:
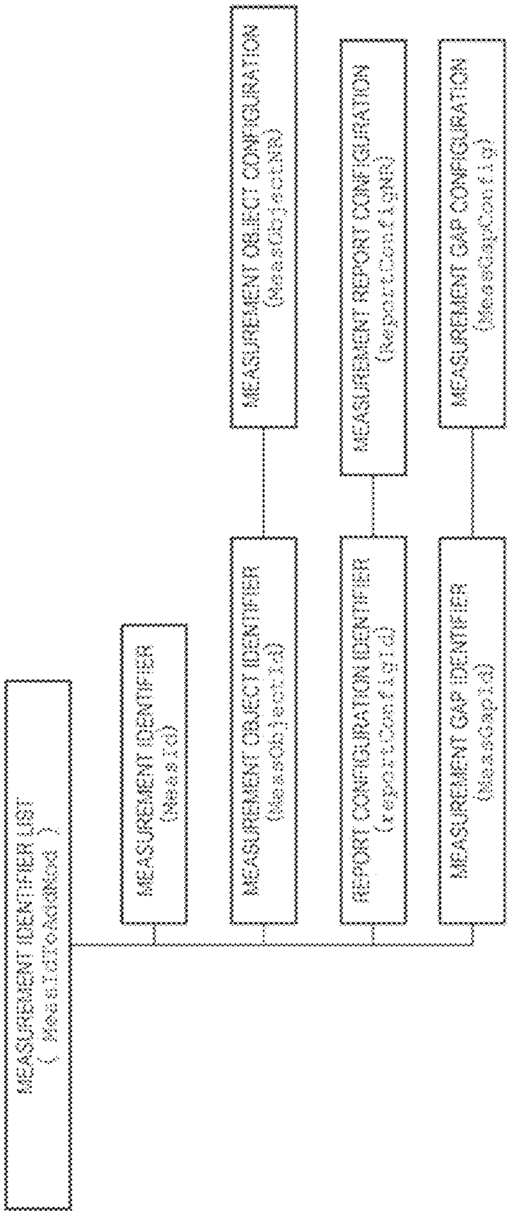
FIG. 11 is a diagram (1/3) for describing information elements in an RRC message according to a second operation example.

The RRC message includes a set of measurement identifier and measurement gap identifier. As illustrated in FIGS. 11 and 13, in the present operation example, the list of measurement identifies (MeasIdToAddMod) includes a set (MeasIdToAddMod) of measurement identifier (MeasId) and measurement gap identifier (MeasGapId). The set further includes the measurement object identifier (MeasObjectId) and the report configuration identifier (reportConfigId). Accordingly, the measurement gap identifier is associated with the measurement identifier. As a result, each of a plurality of measurement configurations is associated with the measurement identifier via the measurement gap identifier.

As illustrated in FIG. 12, the measurement configuration may include an existing measurement gap configuration (MeasGapConfig), separately from the list of measurement gap configurations. The existing measurement gap configuration may be dealt as one of a plurality of measurement gap configurations. The measurement gap configurations in the list of measurement gap configurations may be dealt as a second or subsequent measurement gap configuration. Alternatively, the existing measurement gap configuration may become unavailable in a case in which a list of measurement gap configurations is included in the RRC message. In addition, the existing measurement gap configuration may be used only in a case in which the UE 100 does not support the configuration of a plurality of gap patterns. In a case in which the UE 100 supports the configuration of a plurality of gap patterns, the existing measurement gap configuration may become unavailable.

Further, the base station 200 associates the measurement gap configuration with the measurement identifier such that each frequency layer is associated with only one gap pattern. Further, in a case in which the reference signals (for example, SSB, CSI-RS, PRS) serving as the measurement object are different even in the same frequency layer, the reference signals may be dealt as different frequency layers.

Steps S102 is similar to those in the above-described operation examples.

Step S103 is similar to that in the above-described operation example. The UE 100 (the controller 120) performs measurement on the measurement object based on the measurement object configuration associated with the same measurement identifier via the measurement object identifier during the measurement gap constituting the gap pattern based on the measurement gap configuration associated with the measurement identifier in one set (MeasIdToAddMod) via the measurement gap identifier.

Further, in a case in which a plurality of measurement objects are present in one measurement gap, the UE 100 (the controller 120) can perform measurement on each measurement object during the measurement gap on the basis of the measurement gap sharing configuration associated with the measurement gap configuration.

Step S104 is similar to that in the above-described operation example.

As described above, in the RRC message, each of a plurality of measurement gap configurations may be associated with the measurement gap identifier. The measurement gap identifier may be associated with the measurement identifier. Accordingly, a plurality of measurement configurations need not to be included in the RRC message. Therefore, a plurality of redundant parameters need not to be included in the measurement configuration, and thus a decrease in signaling efficiency can be suppressed.

Further, the RRC message may include a set of measurement identifier and measurement gap identifier. Accordingly, the UE 100 (the controller 120) associates each of a plurality of measurement gap configurations with the measurement identifier via the measurement gap identifier. Therefore, even though a plurality of gap patterns are configured, the UE 100 can determine the gap pattern to be used for measurement and a type of measurement. Further, the base station 200 can appropriately control the gap pattern which is used for measurement by the UE 100. As a result, in a case in which a plurality of gap patterns are configured, appropriate measurement can be performed.

Further, the RRC message may include a set of each of a plurality of measurement gap configurations and measurement gap sharing configuration. Accordingly, since the measurement gap sharing configuration to be applied can be changed for each measurement gap configuration, the measurement of the UE 100 can be flexibly controlled. As a result, in a case in which a plurality of gap patterns are configured, appropriate measurement can be performed.

(2-2) First Modification Example of Second Operation Example

A first modification example of the second operation example will be described with reference to FIGS. 14 and 15, focusing on differences from the above-described operation examples.

As illustrated in FIG. 14, the measurement configuration (MeasConfig) included in the RRC message includes a list (MeasGapSharingToAddModList) of measurement gap sharing configurations to be added and/or changed. Further, the measurement configuration may include a list of measurement gap sharing identifiers (MeasGapSharingToRemoveList) identifying the measurement gap sharing configurations to be removed.

As illustrated in FIG. 15, the list of measurement gap sharing configurations (MeasGapSharingToAddModList) includes a set of each of a plurality of measurement gap sharing configurations (MeasGapSharingConfig) and measurement gap sharing identifier (MeasGapSharingId). Accordingly, each of a plurality of measurement gap configurations is associated with the measurement gap sharing identifier identifying an associated measurement gap sharing configuration.

In addition, the list of measurement identifiers (MeasIdToAddModList) includes a set (MeasIdToAddMod) of measurement identifier, measurement object identifier, report configuration identifier, measurement gap identifier, and measurement gap sharing identifier. Therefore, the measurement gap identifier is associated with the measurement gap sharing identifier. As a result, each of a plurality of measurement gap configurations is associated with the measurement gap sharing configuration via the measurement gap identifier and the measurement gap sharing identifier. Accordingly, even though the RRC message includes a plurality of measurement gap configurations, the UE 100 (the controller 120) can detect the gap pattern to which the measurement gap sharing configuration is to be applied and perform appropriate measurement. As a result, in a case in which a plurality of gap patterns are configured, appropriate measurement can be performed. Further, since the measurement gap sharing configuration to be applied can be changed for each measurement gap configuration, the measurement of the UE 100 can be flexibly controlled.

(2-3) Second Modification Example of Second Operation Example

A second modification example of the second operation example will be described, focusing on differences from the above-described operation examples.

In the RRC message, all of a plurality of measurement gap configurations may be associated with a single measurement gap sharing configuration. Specifically, the measurement configuration (MeasConfig) may include only one measurement gap sharing configuration. Accordingly, even though a plurality of gap patterns based on a plurality of measurement gap configurations are configured, the UE 100 (the controller 120) can share the measurement gap in the time division manner on the basis of the same measurement gap sharing configuration. As a result, since a plurality of measurement gap sharing configurations need not be included in the RRC message, the amount of information included in the RRC message can be reduced.

(3) Third Operation Example

A third operation example will be described with reference to FIGS. 7, 16, and 17, focusing on differences from the above-described operation examples. In the third operation example, each of a plurality of measurement report configurations includes the measurement gap identifier.

In step S101, the base station 200 (the controller 230) generates the RRC message, similarly to the above-described operation examples. The RRC message includes a plurality of measurement report configurations constituted by the measurement report configurations. Specifically, the measurement configuration (MeasConfig) in the RRC message includes a list of measurement report configurations (ReportConfigToAddModList). In addition, the RRC message includes a list of measurement gap configurations (MeasGapToAddModList), similarly to the second operation example.

Figure 16:
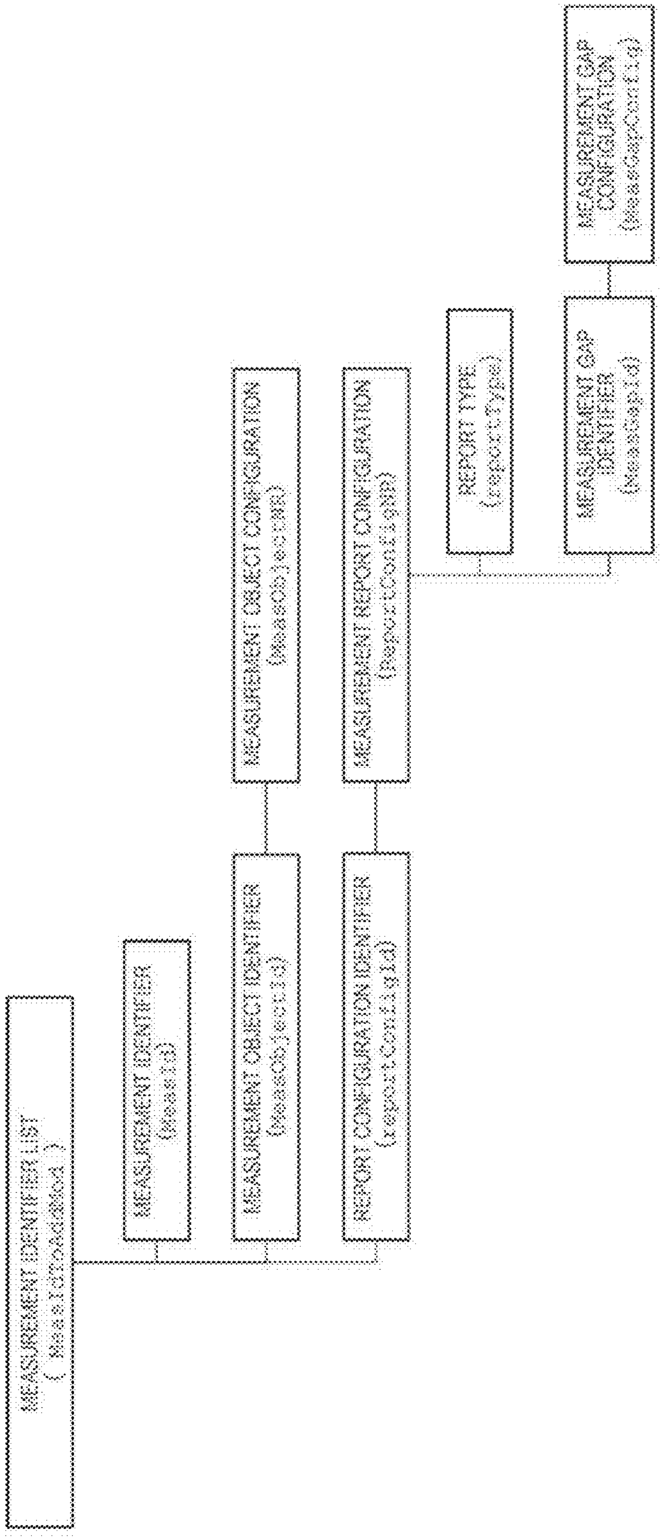
FIG. 16 is a diagram (1/2) for describing information elements in an RRC message according to a third operation example.

As illustrated in FIGS. 16 and 17, each of a plurality of measurement report configurations includes the measurement gap identifier. Specifically, the measurement report configuration includes a set of report type (reportType) indicating a type of measurement report configuration and measurement gap identifier (MeasGapId). Accordingly, the measurement gap identifier is associated with the measurement identifier via the measurement report identifier associated with the measurement report configuration including the measurement gap identifier. As a result, each of a plurality of measurement configurations is associated with the measurement identifier via the measurement gap identifier.

Further, the measurement gap sharing configuration may be included in the RRC message, similarly to any of the described above operation examples.

Steps S102 is similar to those in the above-described operation examples.

Step S103 is similar to that in the above-described operation example. The UE 100 (the controller 120) performs measurement on the measurement object based on the measurement object configuration associated with the same measurement identifier via the measurement object identifier during the measurement gap constituting the gap pattern based on the measurement gap configuration associated with the measurement identifier via the report configuration identifier and the measurement gap identifier.

Step S104 is similar to that in the above-described operation example.

As described above, the RRC message may include a plurality of measurement report configurations constituted by the measurement report configurations. Each of a plurality of measurement report configurations may include the measurement gap identifier. Each of a plurality of measurement gap configurations is associated with the measurement identifier via the reporting configuration identifier and the measurement gap identifier. Therefore, even though a plurality of gap patterns are configured, the UE 100 can determine the gap pattern to be used for measurement and a type of measurement. Further, the base station 200 can appropriately control the gap pattern which is used for measurement by the UE 100. As a result, in a case in which a plurality of gap patterns are configured, appropriate measurement can be performed.

(4) Fourth Operation Example

A fourth operation example will be described with reference to FIGS. 7, 18, and 19, focusing on differences from the above-described operation examples. In the fourth operation example, each of a plurality of measurement object configurations includes the measurement gap identifier.

In step S101, the base station 200 (the controller 230) generates the RRC message, similarly to the above-described operation examples. The RRC message includes a plurality of measurement object configurations constituted by the measurement object configurations. Specifically, the measurement configuration (MeasConfig) in the RRC message includes a list of measurement objects (MeasObjectToAddModList). In addition, the RRC message includes a list of measurement gap configurations (MeasGapToAddModList), similarly to the second operation example.

Figure 18:
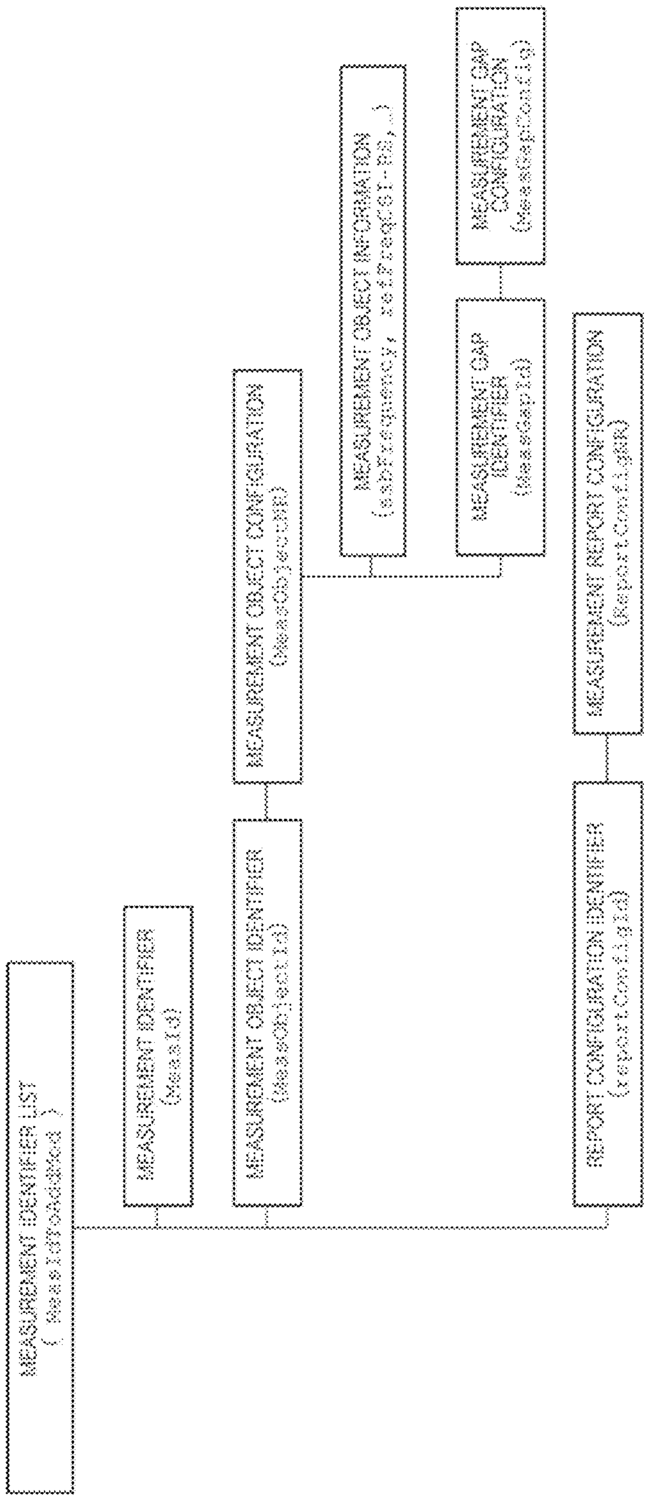
FIG. 18 is a diagram (1/2) for describing information elements in an RRC message according to a fourth operation example.

As illustrated in FIGS. 18 and 19, each of a plurality of measurement object configurations includes the measurement gap identifier. Specifically, the measurement object configuration (MeasObjectNR) includes a set of measurement object information (for example, ssbFrequency, ssbSubcarrierSpacing, smtc1, smtc2, refFreqCSI-RS, referenceSignalConfig, and the like) and measurement gap identifier. Accordingly, the measurement gap identifier is associated with the measurement identifier via the measurement object identifier associated with the measurement object configuration including the measurement gap identifier. As a result, each of a plurality of measurement configurations is associated with the measurement identifier via the measurement gap identifier.

Further, the measurement gap sharing configuration may be included in the RRC message, similarly to any of the described above operation examples.

Steps S102 is similar to those in the above-described operation examples.

Step S103 is similar to that in the above-described operation example. The UE 100 (the controller 120) performs measurement on the measurement object based on the measurement object configuration associated with the measurement object identifier included in the same measurement object configuration during the measurement gap constituting the gap pattern based on the measurement gap configuration associated with the measurement gap identifier included in the measurement object configuration.

Step S104 is similar to that in the above-described operation example.

As described above, the RRC message may include a plurality of measurement object configurations constituted by the measurement object configurations. Each of a plurality of measurement object configurations may include the measurement gap identifier. Each of a plurality of measurement gap configurations is associated with the measurement identifier via the measurement object identifier and the measurement gap identifier. Further, each of a plurality of measurement gap configurations is associated with the measurement object configuration in the same measurement object configuration via the measurement gap identifier. Therefore, even though a plurality of gap patterns are configured, the UE 100 can determine the gap pattern to be used for measurement and a type of measurement. Further, the base station 200 can appropriately control the gap pattern which is used for measurement by the UE 100. As a result, in a case in which a plurality of gap patterns are configured, appropriate measurement can be performed.

In addition, since one measurement gap configuration is associated with one measurement object configuration, each frequency layer can be associated with only one gap pattern.

(5) Fifth Operation Example

A fifth operation example will be described with reference to FIGS. 7 and 20, focusing on differences from the above-described operation examples. In the fifth operation example, the measurement gap identifier is configured, independently of a measurement object configuration for a first reference signal and a measurement object configuration for a second reference signal.

In step S101, the base station 200 (the controller 230) generates the RRC message, similarly to the above-described operation examples. Similarly to the fourth operation example, the RRC message includes a list of measurement objects (MeasObjectToAddModList) and a list of measurement gap configurations (MeasGapToAddModList).

As illustrated in FIG. 20, each of a plurality of measurement object configurations may include measurement object configurations (that is, the measurement object information) for a plurality of reference signals. For example, each of a plurality of measurement object configurations includes a measurement object configuration (For example, ssbFrequency, ssbSubcarrierSpacing, smtc1, smtc2, and the like) for a first reference signal (For example, SSB) and a measurement object configuration (for example, refFreqCSI-RS, etc.) for a second reference signal (for example, CSI-RS).

Further, each of a plurality of measurement object configurations includes the measurement gap identifier. The measurement gap identifier is configured, independently of each of a plurality of reference signals. Specifically, the measurement gap identifier is configured, independently of the measurement object configuration for the first reference signal and the measurement object configuration for the second reference signal. As illustrated in FIG. 20, for example, the measurement gap identifier (measGapIdSsb) for SSB is configured in the measurement object configuration for SSB, and the measurement gap identifier (measGapIdCSI-RS) for CSI-RS is configured in the measurement object configuration for CSI-RS.

Further, the measurement gap sharing configuration may be included in the RRC message, similarly to any of the described above operation examples.

Steps S102 is similar to those in the above-described operation examples.

Step S103 is similar to that in the above-described operation example. The UE 100 (the controller 120) performs measurement on the measurement object based on the measurement object configuration for the first reference signal associated with the measurement object identifier included in the same measurement object configuration during the measurement gap constituting the gap pattern based on the measurement gap configuration associated with the measurement gap identifier for the first reference signal. Similarly, the UE 100 (the controller 120) performs measurement on the measurement object based on the measurement object configuration for the second reference signal associated with the measurement object identifier included in the same measurement object configuration during the measurement gap constituting the gap pattern based on the measurement gap configuration associated with the measurement gap identifier for the second reference signal.

Step S104 is similar to that in the above-described operation example.

As described above, each of a plurality of measurement object configurations may further include the measurement object configuration for the first reference signal and the measurement object configuration for the second reference signal. The measurement gap identifier may be configured, independently of the measurement object configuration for the first reference signal and the measurement object configuration for the second reference signal. Accordingly, it is possible to apply a different measurement gap configuration to each reference signal serving as the measurement object while associating one measurement gap configuration with one measurement object configuration.

Other Embodiments

In the above-described embodiment, in the second to fifth operation examples, the measurement gap identifier is associated with the measurement identifier, but the present invention is not limited thereto. Instead of the measurement gap identifier, the measurement gap configuration itself may be associated with the measurement identifier. Accordingly, the measurement gap identifier may be replaced with the measurement gap configuration. In this case, the measurement configurations can be constituted not to include a list of measurement gap configurations (MeasGapToAddModList) to be added and/or changed. Also, the measurement configuration may include a list of measurement gap configurations to be removed instead of the list of measurement gap identifiers to be removed (MeasGapToRemoveList).

In the third operation example, each of a plurality of measurement report configurations (ReportConfigNR) includes the measurement gap identifier (MeasGapId), but the present invention is not limited thereto. For example, in the list of measurement report configurations (ReportConfigToAddModList), each measurement report configuration (ReportConfigToAddMod) that is information elements higher in order than the measurement report configuration (ReportConfigNR) may be associated with the measurement gap identifier (MeasGapId) or the measurement gap configuration (MeasGapConfig). For example, the list of measurement report configurations may include a set of measurement report configuration (ReportConfigToAddMod) and measurement gap identifier (MeasGapId) or measurement gap configuration (MeasGapConfig). The measurement report configuration (ReportConfigToAddMod) may include the measurement gap identifier (MeasGapId) or the measurement gap configuration (MeasGapConfig) outside the measurement report configuration (ReportConfigNR).

In the fourth and fifth operation examples, each of a plurality of measurement object configurations (MeasObjectNR) includes the measurement gap identifier (MeasGapId), but the present invention is not limited thereto. For example, in the list of measurement object configurations (MeasObjectToAddModList), each measurement object configuration (MeasObjectToAddMod) which is an information element higher in order than the measurement object configuration (MeasObjectNR) may be associated with the measurement gap identifier (MeasGapId) or the measurement gap configuration (MeasGapConfig). For example, the list of measurement object configurations may include a set of measurement object configurations (MeasObjectToAddMod) and measurement gap identifiers (MeasGapId) or measurement gap configurations (MeasGapConfig). The measurement object configuration (MeasObjectToAddMod) may include the measurement gap identifier (MeasGapId) or the measurement gap configuration (MeasGapConfig) outside the measurement object configuration (MeasObjectNR).

The operation sequence (and the operation flow) in the above-described embodiment may not necessarily be executed in time series according to the order described in the flow diagram or the sequence diagram. For example, the steps in the operation may be performed in an order different from the order described in the flowchart or the sequence diagram, or may be performed in parallel. In addition, some of the steps in the operation may be removed or additional steps may be added to the process. Furthermore, the operation sequence (and the operation flow) in the above-described embodiment may be performed separately and independently, or may be performed by combining two or more operation sequences (and operation flows). For example, some steps of one operation flow may be added to other operation flows, or some steps of one operation flow may be replaced with some steps of other operation flows.

In the above-described embodiments, the mobile communication system based on the NR is described as the example of the mobile communication system 1. However, the mobile communication system 1 is not limited to this example. The mobile communication system 1 may be a system conforming to the TS of any of LTE (Long Term Evolution) or other generation systems (for example, sixth generation) of the 3GPP standard. The base station 200 may be an eNB providing protocol terminations of E-UTRA user plane and control plane toward the UE 100 in LTE. The mobile communication system 1 may be a system conforming to a TS defined in a standard other than the 3GPP standard. The base station 200 may be an integrated access and backhaul (IAB) donor or an IAB node.

A program for causing a computer to execute each process performed by the UE 100 or the base station 200 may be provided. The program may be recorded in a computer readable medium. The program may be installed in the computer by using the computer readable medium. Here, the computer readable medium in which the program is recorded may be a non-transitory recording medium. The non-transitory recording medium is not particularly limited, but may be, for example, a recording medium such as a CD-ROM (Compact Disk Read Only Memory) or a DVD-ROM (Digital Versatile Disc Read Only Memory). Furthermore, a circuit that executes each process to be performed by the UE 100 or the base station 200 may be integrated, and at least a part of the UE 100 or the base station 200 may be configured as a semiconductor integrated circuit (a chipset or a SoC (System On Chip)).

In the above-described embodiment, “transmit” may mean performing a process of at least one layer in a protocol stack used for transmission, or may mean physically transmitting a signal wirelessly or by wire. Alternatively, “transmit” may mean a combination of performing of the process of at least one layer and physically transmitting of a signal wirelessly or by wire. Similarly, “receive” may mean performing a process of at least one layer in a protocol stack used for reception, or may mean physically receiving a signal wirelessly or by wire. Alternatively, “receive” may mean a combination of performing of the processing of at least one layer and physically receiving of a signal wirelessly or by wire. Similarly, “acquire (obtain/acquire)” may mean acquiring information from stored information, may mean acquiring information from information received from other nodes, or may mean acquiring information by generating the information. Similarly, the descriptions “on the basis of” and “depending on/in response to” do not mean “only on the basis of” or “depending only on” unless explicitly stated otherwise. The description “on the basis of” means both “only on the basis of” and “at least in part on the basis of” Similarly, the description “according to” means both “only according to” and “at least partially according to.” Similarly, “include” and “comprise” do not mean to include only the listed items, but mean that the terms may include only the listed items or may include additional items in addition to the listed items. Similarly, in the present disclosure, “or” does not mean exclusive OR but means OR. Moreover, any reference to elements using designations such as “first”, “second”, and the like used in the present disclosure does not generally limit the amount or order of those elements. These designations may be used in the present disclosure as a convenient method to distinguish between two or more elements. Therefore, references to first and second elements do not mean that only two elements can be employed therein or that the first element should precede the second element in any form. In the present disclosure, when articles such as a, an, and the in English are added by translation, these articles include a plurality of articles unless the context clearly indicates otherwise.

Although the present disclosure has been described in accordance with examples, it is understood that the present disclosure is not limited to the examples or structures. Various modifications or modifications within an equivalent range are also included in the present disclosure. In addition, various combinations or modes, or other combinations or modes including only one element, more elements, or less elements are also included within the scope and idea of the present disclosure.

(Supplementary Notes)

Features related to the above-described embodiment are additionally described.

(Supplementary Note 1)

A communication apparatus, comprising:

a communicator configured to receive a radio resource control (RRC) message including a plurality of measurement gap configurations from a network; and a controller configured to perform measurement on a measurement object during each measurement gap configured on a basis of the plurality of measurement gap configurations, wherein the RRC message includes a measurement gap sharing configuration that is associated with each of the plurality of measurement gaps and designates a measurement gap sharing scheme.

(Supplementary Note 2)

The communication apparatus according to supplementary note 1, wherein the RRC message includes a set of each of the plurality of measurement gap configurations and the measurement gap sharing configuration.

(Supplementary Note 3)

The communication apparatus according to supplementary note 1 or 2, wherein the measurement gap sharing configuration indicates a time ratio when a plurality of measurement objects share the measurement gap in a time division manner.

(Supplementary Note 4)

The communication apparatus according to any one of supplementary notes 1 to 3, wherein the controller is configured to perform the measurement on a basis of the measurement gap sharing configuration.

(Supplementary Note 5)

A base station, comprising:

a communicator configured to transmit a radio resource control (RRC) message including a plurality of measurement gap configurations to a communication apparatus, wherein the RRC message includes a measurement gap sharing configuration that is associated with each of the plurality of measurement gaps and designates a measurement gap sharing scheme.

(Supplementary Note 6)

A communication method performed by a communication apparatus, comprising the steps of:

receiving a radio resource control (RRC) message including a plurality of measurement gap configurations from a network; and performing measurement on a measurement object during each measurement gap configured on a basis of the plurality of measurement gap configurations, wherein the RRC message includes a measurement gap sharing configuration that is associated with each of the plurality of measurement gaps and designates a measurement gap sharing scheme.

The invention claimed is:

1. A communication apparatus comprising:

a receiver configured to receive by using a radio resource control (RRC) message, from a base station, a measurement configuration including first information and second information, the first information used for configuring a measurement object included in a list of measurement objects to be added, the second information used for configuring each of a plurality of gap patterns, wherein the second information includes information for indicating a repetition period of a measurement gap and information for indicating an offset of a gap pattern with the repetition period of the measurement gap; and a controller configured to perform a measurement on a synchronization signal and physical broadcast channel block (SSB) within the measurement gap of the gap pattern among the plurality of gap patterns, based on information for indicating the SSB to be measured and a first measurement gap identifier indicating the measurement gap for the SSB measurement, wherein the information for indicating the SSB and the first measurement gap identifier are included in the first information, and perform a measurement on a channel state information reference signal (CSI-RS) within the measurement gap of the gap pattern among the plurality of gap patterns, based on information for indicating the CSI-RS to be measured and a second measurement gap identifier indicating the measurement gap for the CSI-RS measurement, wherein the information for indicating the CSI-RS and the second measurement gap identifier are included in the first information, wherein the receiver is configured to receive, from the base station, information for indicating a measurement gap sharing scheme applied to each of the plurality of gap patterns configured by using the second information, and the controller is configured to perform a measurement based on the measurement gap sharing scheme in a case where the information for indicating the measurement gap sharing scheme is received.

2. The communication apparatus according to claim 1, wherein the information for indicating the SSB includes information for indicating a frequency of the SSB.

3. A base station comprising:

a transmitter configured to transmit by using a radio resource control (RRC) message, to a communication apparatus, a measurement configuration including first information and second information, the first information used for configuring a measurement object included in a list of measurement objects to be added, the second information used for configuring each of a plurality of gap patterns, wherein the second information includes information for indicating a repetition period of a measurement gap and information for indicating an offset of a gap pattern with the repetition period of the measurement gap; and a receiver configured to receive, from the communication apparatus, a measurement report based on a synchronization signal and physical broadcast channel block (SSB) measured within the measurement gap of the gap pattern among the plurality of gap patterns based on information for indicating the SSB to be measured and a first measurement gap identifier indicating the measurement gap for the SSB measurement, wherein the information for indicating the SSB and the first measurement gap identifier are included in the first information, and receive, from the communication apparatus, a measurement report based on a channel state information reference signal (CSI-RS) measured within the measurement gap of the gap pattern among the plurality of gap patterns based on information for indicating the CSI-RS to be measured and a second measurement gap identifier indicating the measurement gap for the CSI-RS measurement, wherein the information for indicating the CSI-RS and the second measurement gap identifier are included in the first information, wherein the transmitter is configured to transmit, to the communication apparatus, information for indicating a measurement gap sharing scheme applied to each of the plurality of gap patterns configured by using the second information, and the receiver is configured to receive, from the communication apparatus, a measurement report based on the measurement gap sharing scheme in a case where the information for indicating the measurement gap sharing scheme is transmitted.

4. The base station according to claim 3, wherein the information for indicating the SSB includes information for indicating a frequency of the SSB.

5. A communication method executed by a communication apparatus, the communication method comprising the steps of:

receiving by using a radio resource control (RRC) message, from a base station, measurement configuration including first information and second information, the first information used for configuring a measurement object included in a list of measurement objects to be added, the second information used for configuring each of a plurality of gap patterns, wherein the second information includes information for indicating a repetition period of a measurement gap and information for indicating an offset of a gap pattern with the repetition period of the measurement gap;

performing a measurement on a synchronization signal and physical broadcast channel block (SSB) within the measurement gap of the gap pattern among the plurality of gap patterns, based on information for indicating the SSB to be measured and a first measurement gap identifier indicating the measurement gap for the SSB measurement, wherein the information for indicating the SSB and the first measurement gap identifier are included in the first information;

performing a measurement on a channel state information reference signal (CSI-RS) within the measurement gap of the gap pattern among the plurality of gap patterns, based on information for indicating the CSI-RS to be measured and a second measurement gap identifier indicating the measurement gap for the CSI-RS measurement, wherein the information for indicating the CSI-RS and the second measurement gap identifier are included in the first information;

receiving, from the base station, information for indicating a measurement gap sharing scheme applied to each of the plurality of gap patterns configured by using the second information; and performing a measurement based on the measurement gap sharing scheme in a case where the information for indicating the measurement gap sharing scheme is received.

6. The communication method according to claim 5, wherein the information for indicating the SSB includes information for indicating a frequency of the SSB.

* * * * *